Jan. 17, 1956  J. T. CLARKE  2,731,411
ELECTRICALLY CONDUCTIVE MEMBRANES AND THE LIKE COMPRISING
THE SULFONATED POLYMERIZATES OF POLYVINYL ARYL COMPOUNDS
Filed Dec. 5, 1951
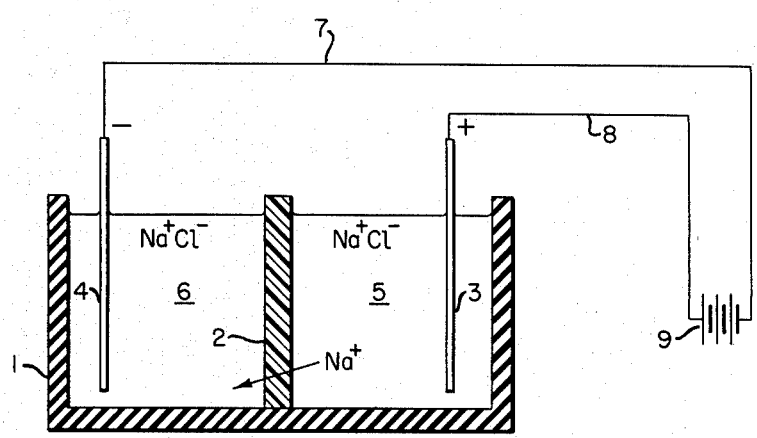
*INVENTOR.*
JOHN THACHER CLARKE
BY
*Kenway, Jenney, Witter & Hildreth*
ATTORNEYS

United States Patent Office 2,731,411
Patented Jan. 17, 1956

2,731,411

ELECTRICALLY CONDUCTIVE MEMBRANES AND THE LIKE COMPRISING THE SULFONATED POLYMERIZATES OF POLYVINYL ARYL COMPOUNDS

John Thacher Clarke, Newton Highlands, Mass., assignor to Ionics, Incorporated, Cambridge, Mass., a corporation of Massachusetts Application December 5, 1951, Serial No. 260,079

15 Claims. (Cl. 204—180)

This invention relates to electrically-conductive, solid unfractured materials, having ionic selectivity and substantial cation exchange capacity and in particular to hydrous, synthetic, organic, electrolytic polymers of predetermined dimensions which are sulfonated polymerizates of polyvinyl aromatic compounds and to methods of preparing them.

Until recently, solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Patent No. 2,636,851, issued April 28, 1953, describes synthetic polymeric materials in the form of hydrous gels which may be formed into such large dimensioned structures as membranes, tubes, rods, vessels, and the like. These materials, like ion exchange resins, include in their polymeric structure dissociable ionizable radicals one component of which is fixed into or retained by the polymeric matrix and at least one component of which consists of a mobile and replaceable ion electrostatically associated with the fixed component. The ability of the mobile ion to be replaced, under appropriate concentration conditions, by ions of the same charge, imparts ion exchange characteristics to these materials.

More important, however, is the effect the fixed radicals have on the electro-conductive properties of these materials. The fixed ions possess charges which attract mobile ions of opposite charge and repel mobile ions of like charge. Under the influence of an electric field, ions charged like the mobile ions may be caused to permeate the polymeric material exclusively of ions of the opposite charge, which are repelled. These materials are accordingly permselective (i. e., selectively permeable) and electrically conductive.

The present invention provides solid polymeric materials having the general electro-chemical characteristics of those described by Juda and McRae. These materials are coherent homogeneous solids which are highly conductive and selectively permeable to cations. An important feature of this invention is that it provides materials which have high cation exchange capacity and which are resistant to hot concentrated solutions of strong acids and alkalies. They are mechanically durable so that they may be formed into self-sustaining structures, and are substantially hydraulically imperable under ordinary pressure differentials, so that they may be used in dialysis and electrodialysis apparatus where advantage may be taken of their selectively permeable and highly conductive properties. Several such arrangements are described in the above-mentioned application of Juda and McRae.

It is well known that granular ion exchange resins of good durability and high capacity may be manufactured by sulfonating polystyrene containing a relatively small amount of a crosslinking agent such as divinyl benzene. An example of such a granular exchange is the product designated Dowex–50 which is prepared by sulfonating a polymer containing about 8 mol per cent of divinyl benzene. Generally these materials contain 5 to 15 per cent of crosslinking. If the amount of crosslinking is increased to as much as 25 mol per cent the resulting tighter network reduces the ion exchange rate of many ions to impractically low values.

Granular exchangers of this type are commonly prepared by polymerizing the monomers by conventional means, for example, en masse or in the presence of solvents or in emulsion. The resulting polymer is then sulfonated, with or without first swelling it by contacting with a suitable solvent. Although this method is satisfactory for the manufacture of granular exchangers it is not suitable for the production of articles of a predetermined size and shape, such as membranes, owing to the fact that it results in products having at most marginal structural strength unless the sulfonation is so mild that the exchange capaciy is far less than that required to provide satisfactory conductivity and permeselectivity for the purposes referred to above.

According to the process of this invention, mixtures of polymerizable compounds including at least 20 mol per cent and preferably at least 30 mol per cent and not more than 80 mol per cent of a polyvinyl aromatic compound are caused to polymerize while maintained in solution in an inert organic solvent under conditions preventive of the evaporation of the solvent. Polymerization is effected by any of the well known expedients, for instance, heat, pressure, and catalytic accelerators, and is continued until an insoluble, infusible gel is formed substantially throughout the volume of solution. The resulting gel structures are then sulfonated in a solvated condition and to such an extent that there are not more than 4 equivalents of sulfonic acid groups formed for each mol of polyvinyl aromatic compound in the polymer and not less than 1 equivalent of sulfonic acid groups formed for each 10 mols of poly- and monovinyl aromatic compound in the polymer.

By maintaining dissolved or dispersed conditions during the polymerization, the polyvinyl aromatic compound polymerizates throughout the volume of solution to form a polymeric matrix which entrains the solvent, thus resulting in a solvated gel structure which is particularly suitable for sulfonation. The volume of the solvent present during this polymerization has been found to determine or fix the equilibrium liquid content of the polymerized gel structure. That is, the gel, when one liquid is replaced by another or by the same liquid, imbibes about the same volume of liquid as was present during polymerization. This is particularly useful since it is often advantageous to carry out the sulfonation in the presence of a solvent which is different from that used in polymerization. The gel does, however, shrink when liquid is removed from it, as by evaporation (regaining nearly the volume on resolvation, however), which indicates that the polymeric matrix of the gel is not rigid but is of limited extensibility.

By operating within the sulfonation and solvent limitations as set forth herein, articles of satisfactory structural strength and electro-chemical properties are produced. Below the lower limit the electro-chemical properties are impaired to the point of rendering the products useless for practical purposes; above the upper limit the products have little coherence or structural strength.

It has been found, however, that the permissible ratio of equivalents of sulfonic acid formed per mol of polyvinyl aromatic compound may be increased to as much as 6.0 or alternately the amount of polyvinyl aromatic compound may be decreased to as little as 20 mol per cent of the total polymerizable material provided a suitable structural reinforcing medium is used. This reinforcing medium should have a tear strength of at least 50 grams for each millimeter of thickness, a void volume of at least 50 per cent, and should have about as good chemical and heat resistance as the polymer.

Generally, it is found that the reinforcing material should constitute at least 5 per cent but not more than 50 per cent by weight of the solvated unsulfonated structure. If less than 5 per cent is used, there will be no appreciable increase in tear resistance and if more than 50 per cent is used, the desirable electro-chemical properties will be seriously reduced. Materials which are suitable for reinforcing the structures of this invention are glass filter cloth, polyvinylidene chloride screen, glass paper, treated cellulose battery paper, polystyrene-coated glass fiber mat, and polyvinyl chloride battery paper and the like.

The polyvinyl aromatic compounds which constitute an essential ingredient of the structures of this invention include the isomeric divinyl benzenes, divinyl toluenes, divinyl naphthalenes, divinyl diphenyls, divinyl-phenyl vinyl ethers, the substituted alkyl derivatives thereof, such as dimethyl divinyl benzenes and similar polymerizable aromatic compounds which are polyfunctional with respect to vinyl groups. It is preferred that the materials be susceptible to polymerization by the free radical mechanism, but materials which polymerize according to the ionic mechanism may also be used.

To an extent of less than 70 mol per cent of the polymerizable materials (80 mol per cent if a suitable reinforcing material is used as described above) there may be present with the polyvinyl aromatic compounds other compounds which copolymerize with the polyvinyl aromatic compounds such as monovinyl aromatic compounds including styrene, and the isomeric vinyl toluenes, vinyl naphthalenes, vinyl ethyl benzenes, vinyl chlorobenzenes, vinyl xylenes, and the alpha substituted alkyl derivatives thereof, such as alpha methyl vinyl benzene. Thus it will be appreciated that commercial polyvinyl aromatic compounds which quite frequently contain considerable amounts of impurities in the form of monovinyl aromatic compounds may be used for purposes of this invention without first removing the monovinyl compounds. In some cases it may be desirable if high-purity polyvinyl aromatic compounds are available, to add monovinyl aromatic compounds so that the polyvinyl aromatic compound may constitute 30 to 80 mol per cent of polymerizable material. However it will be understood that products having from 20 to 100 mol per cent of polyvinyl aromatic compound can be prepared.

Suitable solvents in which the polymerizable material may be dissolved prior to polymerization should be inert to the polymerization (in that they do not react chemically with the monomers or polymer), should also possess a boiling point greater than 60° C., and should be miscible with the sulfonation medium. They include, for example, aromatic hydrocarbons such as toluene, benzene, and diethylbenzene; alcohols such as iso-propanol; ketones such as cyclohexanone; ethers such as dioxane or dichloro diethyl ether; halogenated hydrocarbons such as ethylene chloride or ethylene bromide; and hydrocarbons such as heptane. Suitable mixtures of solvents may be employed also. Hydrocarbons such as heptane which are not readily miscible with sulfonation media are not recommended in preference to other solvents when the polymerized structures are sulfonated without removing the solvent of polymerization. Other solvents may be used which are susceptible of forming solutions of the required concentration with the vinyl aryl compounds and which do not interfere with the polymerization of vinyl monomers.

Prior to polymerization the polymerizable ingredients are dissolved in the solvent to form a solution containing at least 25 per cent by volume of solvent. The polymerizable ingredients present in this solution should preferably include at least 30 mol per cent and not more than 80 mol per cent of the polyvinyl aromatic compound (based on the total polymerizable ingredients), and may consist entirely of commercial polyvinyl aryl compound. Especially satisfactory products may be produced from solutions containing between 40 and 55 per cent by volume of solvent wherein the polymerizable ingredients include between 35 and 55 mol per cent of polyvinyl aromatic compound. The solution may contain even larger amounts of solvent, provided its presence does not interfere with the physical structure of the solid; structures containing as much as 75 per cent by volume of solvent have been found satisfactory. A catalyst for the polymerization should also be incorporated in the solution prior to the polymerization. Where polymerization is by the free-radical mechanism, suitable catalysts include benzoyl peroxide and 2-azo-bis(isobutyronitrile); where polymerization is by the ionic mechanism, a suitable catalyst is boron trifluoride.

Solid gel structures are formed in accordance with the process of this invention by casting or molding (including pressure molding) the solution of polymerizable ingredients and causing polymerization thereof in the mold, as by heating, while preventing the evaporation or escape of substantial amounts of solvent. Conditions preventive of the evaporation of solvent may be provided by closing the molds or by otherwise carrying out the polymerization under saturated solvent conditions. Polymerization is generally satisfactorily accomplished by heating the solution to between 50° and 100° C., and preferably between 80° and 90° C., and maintaining the solution at this temperature until polymerization is complete. Under these conditions of polymerization, there is formed a solid unfractured gel structure having a continuous solvent phase in intimate association with a cured polymeric matrix.

The solvent phase may be replaced before sulfonation by other solvating liquids as by leaching the gel structure in them, but it is preferable not to allow the net liquid content of the gel to be materially reduced. Hydrocarbons (e. g., heptane) and similar solvents used for polymerization may thus be replaced by a solvent suitable for sulfonation. The polymerized structures are apparently homogeneous and are also coherent and continuously uniform.

In this manner, forms and structures may be prepared in any desired shape or form or size, including structures having at least two dimensions greater than ¼ inch and which are accordingly far greater in size than structures in which conventional ion exchange materials of this type have been made in the past. These structures may, if desired, be further formed as by machining or grinding.

Ordinary polymerizing conditions in which a solvent is not present or in which it is allowed to escape or evaporate do not generally result in the formation of continuous coherent or homogeneous structures having desirable electro-chemical properties. Either a continuous resinous dielectric results, as is typified by the well-known styrene molding resins, or a fractured or particulate structure results, as is typified by the granular ion exchange resins.

The presence and maintenance of a solvating liquid during the polymerization of the vinyl aromatic compounds appears to dispose the polymerizate in a condition particularly suitable for incorporating the desired amount of solvent. Thus it is found that if a polymerizate is manufactured using 30 per cent of solvent and is subsequently dried, it will imbide 30 per cent of the liquid on being contacted with a solvating liquid again. Similarly the structure after sulfonation will contain about 30 per cent by volume of solvating liquid so long as the extent of sulfonation does not exceed 4 equivalents per mol of polyvinyl aromatic compound and the sulfonating technique has not been so drastic as to destroy part of the crosslinking. In like manner, a polymerizate produced with 50 per cent solvating liquid, will, on drying and resolvating, have again 50 per cent of liquid and on sulfonating will maintain approximately 50 per cent of liquid. This phenomena has been found to occur throughout the range of 25 to 75 per cent solvent. This is an important feature of the invention.

After the polymerized gel structure has been formed, it is treated with a sulfonating agent whereby sulfonic acid groups are incorporated into the polymeric matrix in the proportions described above. During sulfonation, the gel should be in equilibrium with some solvating liquid which may be the sulfonating agent itself. Suitable sulfonating agents include sulfur trioxide preferably dissolved in a suitable solvent such as ethylene chloride, concentrated sulfuric acid (with or without an activator such as silver oxide), oleum, and chlorosulfonic acid. The gel is treated with the sulfonating agent at room temperature, or if desired, at elevated temperatures.

After sulfonation of the gel structure, it is important not to permit the liquid content thereof to become materially reduced, lest cracking or loss of electrical properties results. Ordinarily the sulfonated structures are most useful in the aqueous form. Generally they may be converted to the aqueous form by immersing them in water, whereupon the liquid present therein is displaced by water. In some cases, however, where the solvating liquid is not water miscible, it may be necessary first to treat the gel structure with a solvating liquid which is miscible with both water and the gel liquid prior to treatment of the gel with water.

The products produced in accordance with this invention have been found to have high electrical conductivities in the aqueous form, generally in excess of $5 \times 10^{-3}$ ohm$^{-1}$ cm.$^{-1}$. They are substantially selectively permeable to cations as indicated by the fact that in the standard concentration cell:

| calomel electrode | sat'd KCl bridge | 0.1 N KCl | membrane | 0.01 N KCl | sat'd KCl bridge | calomel electrode |
| --- | --- | --- | --- | --- | --- | --- | at 25° C., a characteristic concentration potential approaching the thermodynamic ideal of 55.1 millivolts may be measured. The ion exchange capacity of these materials is in excess of 0.3 milliequivalents per gram of solid material less solvent after correction has been for reinforcing material, if any. They possess hydraulic resistivities in excess of $10^2$ atm. sec. cm.$^{-2}$ (the pressure in atmospheres required to cause liquid to permeate a centimeter cube of the material at the rate of one cubic centimeter per second.)

Thus, it will be apparent that these structures may be utilized advantageously for electrodialysis processes wherein it is desired to transmit cations from one electrolytic solution to another substantially exclusively of anions. This may be done by separating the two solutions by a membrane or barrier produced in accordance with this invention, and passing an electric current through the solutions and membrane or barrier in series by means of an applied potential of the polarity required for the desired transfer.

The preferred polyvinyl aromatic compound thus far employed in this invention is divinyl benzene. This product in its commercial form generally contains substantial quantities of other aromatic liquids, such as ethyl vinyl benzene and diethyl benzene. The former of these is a monovinyl compound which copolymerizes with divinyl benzene and its presence may be tolerated as explained above. The other compound, diethyl benzene, is inert to polymerization and as such should be considered as part of the solvent content of the polymerizable mixture.

The results of actual analysis of three lots of commercial divinyl benzene, one specified as being 20–25 per cent divinyl benzene, another 50–60 per cent divinyl benzene, and the third as 76 per cent are given below.

TABLE I

|  | 20–25% DVB | 50–60% DVB | 76% DVB |
| --- | --- | --- | --- |
|  | Percent | Percent | Percent |
| Divinyl benzene | 17 | 55 | 76 |
| Ethylvinyl benzene | 49 | 35 | 23 |
| Diethyl benzene | 34 | 10 | 1 |

Sulfonation is preferably accomplished by means of concentrated sulfuric acid containing about 0.2 per cent of silver oxide as catalyst, at 90° C. It has been found that sulfonation with sulfuric acid is particularly efficient if the solvent of polymerization is replaced with ethylene chloride or other suitable chlorinated hydrocarbon before sulfonation. A marked improvement in mechanical and electro-chemical properties generally results. However, sulfur trioxide complexed with dichlorodiethyl ether or other ethers at room temperature, or chlorosulfonic acid at room temperature may also be used.

The rate of polymerization depends in part upon the concentration and nature of the solvent and catalyst present and upon the temperature of the polymerization, and should be so controlled as to allow convenient casting of the polymerizable solution and to prevent undue temperature increases which may result in the escape of solvent or the formation within the polymerizing solution of solvent vapor bubbles by the heat of polymerization. Suitable proportions of catalysts and conditions of polymerization in particular applications will be illustrated in the examples. In general, the best results are obtained when the nature and concentration of catalysts and the temperature are such as to require at least one hour for the completion of polymerization.

The proportions in which the polymerizable ingredients should be combined are most accurately described in molar ratios. In this connection, it is necessary to take into account the fact that commercial polyvinyl aryl compounds contain considerable amounts of impurities; for example, divinyl benzene of commerce contains up to 70 mol per cent of ethyl vinyl benzene and other impurities which are separable with only great difficulties. (The amount of divinyl benzene or other divinyl aryl compounds may be determined from a knowledge of the level of unsaturation as found by titration with bromine solutions.) Preferably the amount of polyvinyl aryl compound is between 0.30 and 0.80 mol per mol of total polymerizable ingredients. For unreinforced structures not more than 4 equivalents of sulfonic acid should be incorporated into the structure for each mol of polyvinyl aryl compound. The extent of sulfonation should be not less than 1 equivalent for each 10 mols of polymerizable ingredients. For the reinforced structures up to 6 equivalents of sulfonic acid may be formed for each mol of polyvinyl aryl compound. The amount of polymerization catalyst is preferably 0.1 to 2.0 per cent by weight of the polymerizable ingredients.

The order of mixing the ingredients is not believed to be important and is illustrated in the examples. In general, the polymerizable aromatic compounds may be dissolved in the solvent of polymerization and the catalysts then added or the polymerizable components may be individually dissolved in portions of the solvent of polymerization and the resulting solutions mixed together with the catalysts. If desired, the mixture of polymerizable ingredients may be partially polymerized before casting. This results in an increase in the viscosity of the solution and may be desirable in some cases to facilitate casting.

The following examples have been selected for purposes of illustration and are not presented to suggest limitations not previously described and not included in the appended claims.

In the accompanying drawing:

Figure 1 is a diagrammatic elevation in cross-section of an electrodialysis cell containing a membrane produced in accordance with the invention.

*Example 1.—Preparation of a reinforced sheet of mildly crosslinked polymeric gel*

| | |
|---|---|
| Divinyl benzene (commercial 20–25% inhibitor free) cc | 66.5 |
| Toluene cc | 13.5 |
| Benzoyl peroxide gram | 0.5 |

The ingredients were mixed together and poured onto a mat 30 mils thick of a paper consisting of polystyrene-coated glass fibers which was then sandwiched between two glass plates. The cast was heated for four hours at 85° C. After cooling to room temperature (25° C.), the cast was separated from the plates. It was a translucent sheet about 40 mils thick. During polymerization, evaporation of solvent into the space between the plates beyond the area occupied by the cast occurred only at the edges of the cast. The dried edges sealed the interior of the cast from additional evaporation of solvent. The dried edges were trimmed off and discarded.

*Example 2.—Sulfonation with sulfuric acid*

About 2 grams of the sheet prepared in Example 1 were immersed in 100 cc. of 95 per cent sulfuric acid (containing about 0.1 gram of silver oxide accelerator). The mixture was maintained at 90° C. for eighteen hours. Thereafter the membrane was treated briefly first in a 1:1 mixture of sulfuric acid and water, then in a 1:3 mixture of sulfuric acid and water, and finally it was thoroughly leached in water. It was a brown, homogeneous, smooth-surfaced, and strong membrane. After leaching in 1 N sodium chloride solution, to convert it to the sodium form, the physical properties were determined. They are reported in Table II. The properties were improved somewhat, particularly with respect to physical strength when the toluene in the polymerized sheet was replaced with ethylene chloride prior to sulfonation.

*Example 3.—Sulfonation with sulfur trioxide*

About 2 grams of membrane prepared in Example 1 were leached thoroughly in ethylene chloride and immersed in a mixture of 5 cc. liquid sulfur trioxide and 30 cc. ethylene chloride. After twenty hours, at room temperature, the membrane was removed from the bath and was thoroughly leached in water. It was yellow, physically strong and quite flexible. After leaching in 1 N sodium chloride, its physical properties were determined. They are reported in Table II.

*Example 4.—Preparation of a sheet of highly crosslinked sulfonated gel*

| | |
|---|---|
| Divinyl benzene (commercial 76% inhibitor-free) cc | 28 |
| Toluene cc | 42 |
| Benzoyl peroxide grams | 0.4 |

The ingredients were mixed together and cast onto a mat 30 mils thick of a paper consisting of polystyrene-coated glass fibers (see Example 1) and sandwiched between two glass plates. The cast was heated for three hours at 80° C. After cooling to room temperature, it was sulfonated with 95 per cent sulfuric acid as in Example 2. The properties are reported in Table II.

*Example 5.—Preparation of a sheet of moderately crosslinked sulfonated gel*

| | |
|---|---|
| Divinyl benzene (commercial 20–25% inhibitor-free) cc | 225 |
| Divinyl benzene (commercial 50–60% inhibitor-free) cc | 55 |
| Toluene cc | 120 |
| Benzoyl peroxide gram | 1.0 |

The ingredients were mixed and further treated as explained in Example 1. The resulting membrane was sulfonated and further treated as explained in Example 3. Its properties are reported in Table II.

TABLE II

| Example | Moisture, percent per wet gram, Na form | Exchange Cap., m. eq. dry gram | Conc. E. M. F., Milliv. | Cond. Na form, ohm$^{-1}$ cm. $^{-1}\times 10^3$ |
|---|---|---|---|---|
| 2 | 44 | 3.5 | 14.2 | 6.5 |
| 3 | 49 | 3.3 | 15.0 | 27.0 |
| 4 | 49 | 2.6 | 8.5 | 4.0 |
| 5 | 49 | 3.4 | 11.0 | 6.7 |

The physical characteristics of the membranes produced in the above examples are set forth in Table II. The moisture content was obtained by drying a specimen in the leached sodium form to constant weight at 105° C. and expressing the loss of weight as per cent of the 105° C. undried material after correction had been made for the weight of the reinforcing material.

The exchange capacities were determined by soaking the structures of the examples (in the leached acid form) in 4 N sodium chloride solution until equilibrium was reached and titrating the sodium chloride solution for liberated hydrogen ion. The capacity is expressed as the number of milliequivalents of hydrogen ion exchanged by the sodium chloride per 105° C. dried gram material in the sodium form after correction had been made for the weight of reinforcing material.

The concentration potential was measured in a concentration cell with specimens separating 0.60 N and 0.30 N sodium chloride solutions. The electrodes were saturated calomel electrodes connected to the sodium chloride solutions by means of saturated potassium chloride salt bridges. The specimens as prepared in the examples (that is, in the sodium form) were brought into equilibrium with water prior to insertion in the cell. The respective solutions in the cell were continuously renewed to maintain the concentrations. The values recorded in Table II are the open circuit potential after steady conditions were attained. In such a cell, the value of the thermodynamically ideal concentration potential is 17 millivolts. It will be seen from Table II that this standard was consistently approached.

The electrical conductivity was measured by forming from a specimen, as prepared according to the examples, a strip 10 cm. long, 1 cm. wide and about 0.1 cm. thick, clamping the ends to copper electrodes, and measuring the resistance to 60 cycle alternating current. The conductivity is the reciprocal of the resistivity.

The following example illustrates the practical application of the structures of this invention in the treatment of liquids containing dissolved ionized substances.

*Example 6.—Removal of cations from solution*

The structures of the above examples may be tested for their water-treating properties in a simple cell shown schematically in Figure 1. Solutions 0.03 N in sodium chloride (a concentration of dissolved substances often found in naturally occurring brackish waters) are held in a container 1 separated by electrolytically conductive structures 2 prepared in accordance with the above examples. Graphite electrodes 3 and 4 are present in the chambers 5 and 6 and are in contact with the sodium chloride solutions contained in the chambers. Electrically conductive leads 7 and 8 connect the electrodes with a source of voltage, for example, a D. C. battery 9 of such polarity that the electrode 3 is anodic. The structures are first equilibrated with 4 N sodium chloride solution and then leached with distilled water. When an electric current is imposed, chlorine is evolved at electrode 3 and hydrogen at electrode 4. It is found that the current is carried across the structure 2 almost completely by sodium ions passing out of chamber 5 into chamber 6, thereby reducing the sodium ion content of the solution in chamber 5.

Ordinarily, the polymerized sulfonated structures are most useful in the aqueous form, that is, when the solvent of sulfonation (which may be the sulfonating agent itself) is replaced, after sulfonation is completed, by water or an aqueous solution. However, the selectively permeable and highly conductive properties of the structures are not significantly altered when the polymerized material is saturated with a non-aqueous hydrophilic solvent. In this instance, the polymerized material may then be used to remove cations from a solution of the hydrophilic solvent by passing an electric current through the solution and the polymerized material to effect the migration of cations into the material.

*Example 7.—Preparation of a sheet of moderately cross-linked sulfonated gel*

| | |
|---|---|
| Divinyl benzene (commercial 50–60% inhibitor free) | cc__ 175 |
| Toluene | cc__ 175 |
| Benzoyl peroxide | gram__ 1.0 |

The ingredients were mixed and further treated as in Example 1. The resulting membrane was sulfonated and further treated as explained in Example 2. Its properties are reported in Table III.

TABLE III

| Moisture, percent per wet gram, Na form, | Exchange Cap., m. eq./dry gram | Conc. E. M. F., milliv. | Cond. Na Form, ohm cm.$^{-1}$×10$^3$ |
|---|---|---|---|
| 50% | 2.6 | 10.5 | 4.1 |

Having thus disclosed my invention, I claim as new and desire to secure by Letters Patent:

1. As an article of manufacture a solid infusible, unfractured structure in the form of a sheet or membrane comprising a coherent matrix of an insoluble, infusible copolymer of a polyvinyl aromatic compound and a monovinyl aromatic compound having sulfonic groups chemically bonded to the aromatic nuclei of said matrix, said copolymer being in gel relationship with at least 25 per cent, by volume on total volume, of a solvating liquid which presents a continuous phase throughout said gel.

2. As an article of manufacture, a solid infusible, unfractured structure in the form of a sheet or membrane comprising a coherent matrix of an insoluble, infusible copolymer of at least 20 mol per cent of a polyvinyl aromatic compound with no more than 80 mol per cent of a monovinyl aromatic compound with a reinforcing material imbedded therein, sulfonate groups being chemically attached to the aromatic nuclei of said matrix in an amount of between $\frac{1}{10}$ and 6 equivalents per mol of poly- and monovinyl aromatic compounds, said copolymer being in gel relationship with at least 25 per cent, by volume on total volume, of a solvating liquid which presents a continuous phase throughout said gel.

3. As an article of manufacture, a solid, unfractured structure in the form of a membrane having two dimensions each in excess of 0.25 inch and comprising as an essential part extending substantially throughout said structure a predominant amount of a homogeneous continuous phase of a cation-exchange resin which comprises: an insoluble, infusible copolymeric matrix formed from a polyvinyl aromatic compound and a monovinyl aromatic compound, sulfonate groups chemically bonded to the aromatic nuclei of said matrix, and a solvating liquid in gel relation with said matrix, said sulfonate groups being present in an amount not more than 4 equivalents of sulfonate groups for each mol of polyvinyl aromatic compound and not less than 1 equivalent of sulfonate groups for each 10 mols of poly- and monovinyl aromatic compound, said solvating liquid being at least 25 per cent by volume of said resin.

4. As an article of manufacture, a solid, unfractured structure in the form of a membrane having at least two dimensions each in excess of 0.25 inch and comprising as an essential part extending substantially throughout said structure a predominant amount of a homogeneous continuous phase of a cation-exchange resin which comprises: an insoluble, infusible copolymeric matrix formed from at least 20 per cent by weight of a polyvinyl aromatic compound and no more than 80 per cent of a monovinyl aromatic compound with a reinforcing material therein, and no more than 70 per cent by weight of a monovinyl aromatic compound without a reinforcing material therein, sulfonate groups chemically bonded to the aromatic nuclei of said matrix and a solvating liquid in gel relationship with said matrix, said sulfonate groups being present in an amount of no more than 4 equivalents of sulfonate groups for each mol of polyvinyl aromatic compound, and not less than 1 equivalent of sulfonate groups for each 10 mols of poly- and monovinyl aromatic compound, and said solvating liquid being at least 25 per cent by volume of said resin.

5. A method of transferring cations from one electrolytic solution to another to the substantial exclusion of anions comprising separating said solutions by means of a barrier and passing a direct electric current in series across said solutions and separating barrier, said barrier comprising as an essential part extending substantially throughout, a predominant amount of a homogenous continuous phase of a cation-exchange resin which comprises: an insoluble, infusible copolymeric matrix formed from at least 20 per cent by weight of a polyvinyl aromatic compound and no more than 80 per cent of a monovinyl aromatic compound with a reinforcing material therein, and no more than 70 per cent by weight of a monovinyl aromatic compound without a reinforcing material therein, sulfonate groups chemically bonded to the aromatic nuclei of said matrix and a solvating liquid in gel relationship with said matrix, said sulfonate groups being present in an amount of no more than 4 equivalents of sulfonate groups for each mol of polyvinyl aromatic compound, and not less than 1 equivalent of sulfonate groups for each 10 mols of poly- and monovinyl aromatic compound, and said solvating liquid being at least 25 per cent by volume of said resin.

6. The article defined by claim 1 wherein the polyvinyl aromatic compound is selected from the group consisting of divinyl benzenes, divinyl toluenes, divinyl naphthalenes, divinyl xylenes, divinyl ethylbenzenes, divinyl chlorobenzenes, divinyl-phenyl vinyl ethers and the alpha-substituted alkyl derivatives thereof.

7. The article defined by claim 1 wherein the polyvinyl aromatic compound is divinylbenzene.

8. The article defined by claim 1 wherein the polyvinyl aromatic compound is selected from the group consisting of divinyl benzenes, divinyl toluenes, divinyl naphthalenes, divinyl xylenes, divinyl ethylbenzenes, divinyl chlorobenzenes, divinyl-phenyl vinyl ethers and the alpha-substituted alkyl derivatives thereof, and the monovinyl aromatic compound is selected from the group consisting of styrene and the isomeric vinyl toluenes, vinyl naphthalenes, vinyl ethylbenzenes, vinyl chlorobenzenes, vinyl xylenes and the alpha-substituted alkyl derivatives thereof.

9. The method of forming a solid unfractured electrically conductive, cation permeable structure in the form of membranes having at least two dimensions each in excess of 0.25 inch, and comprising as an essential part extending substantially throughout said structure a predominant amount of a sulfonated copolymerizate of polyvinyl and monovinyl aromatic compounds comprising: the steps of polymerizing at least one polyvinyl aromatic compound and at least one monovinyl aromatic compound to the insoluble, infusible stage while maintained under conditions substantially preventive of the escape of solvent in a solution containing at least 25% by volume of inert organic solvent, said polyvinyl aromatic compound being at least 20% by weight of all polymerizable ingredients dissolved in said solution, thereby forming a solid membrane structure, subsequently sulfonating said structure under conditions preventive of the escape of solvent therein, and saturating the sulfonated structure with water.

10. The method of forming a solid unfractured electrically conductive, cation permeable structure in the form of sheets and membranes comprising as an essential part extending substantially throughout said structure a sulfonated polymerization product of polyvinyl-monovinyl aromatic compounds, comprising: the steps of polymerizing in the form of membranes to the insoluble, infusible stage at least on monovinyl aromatic compound and at least one polyvinyl aromatic compound of the group consisting of divinyl benzenes, divinyl toluenes, divinyl naphthalenes, divinyl xylenes, divinyl ethyl benzenes, divinyl chloro benzenes, divinyl-phenyl vinyl ethers and the alpha-substituted alkyl derivatives thereof, while maintained under conditions substantially preventive of the escape of solvent in a solution containing at least 25% by volume of an inert organic solvent, said polyvinyl aromatic compound being at least 20% by weight of all polymerizable ingredients dissolved in said solution thereby obtaining an unfractured membrane, subsequently sulfonating said solid unfractured structure under conditions substantailly preventive of the escape of solvent therein, and saturating the sulfonated structure with water.

11. The method of forming a solid unfractured electrically conductive cation permeable structure in the form of sheets and membranes having at least two dimensions each in excess of 0.25 inch and comprising as an essential part extending substantially throughout said structure a sulfonated polymerization product of polyvinyl and monovinyl aromatic compounds, comprising: the steps of forming a solution of at least one monovinyl aromatic compound and at least one polyvinyl aromatic compound of the group consisting of divinyl benzenes, divinyl toluenes, divinyl naphthalenes, divinyl xylenes, divinyl ethyl benzenes, divinyl chloro benzenes, divinyl-phenyl vinyl ethers and the alpha-substituted alkyl derivatives thereof, containing at least 25% by volume of inert organic solvents, said polyvinyl aromatic compound being at least 20% by weight of all polymerizable ingredients dissolved in said solution, casting said solution to the desired form, polymerizing the polyvinyl monovinyl aromatic compounds of said solution to the insoluble, infusible stage under conditions substantially preventive of the escape of solvent to form a solid structure of the cast form, and sulfonating said resulting structure under conditions substantially preventive of the escape of solvent.

12. The method of forming a solid unfractured electrically conductive cation permeable structure in the form of sheets and membranes having at least two dimensions each in excess of 0.25 inch and comprising as an essential part extending substantially throughout said structure a sulfonated polymerization product of monovinyl and polyvinyl aromatic compounds, comprising: the steps of forming a solution of at least one monovinyl aromatic compound and at least one polyvinyl aromatic compound of the group consisting of divinyl benzenes, divinyl toluenes, divinyl naphthalenes, divinyl xylenes, divinyl ethyl benzenes, divinyl chloro benzenes, divinylphenyl vinyl ethers and the alpha-substituted alkyl derivatives thereof, containing at least 25% by volume of inert organic solvents, said polyvinyl aromatic compound being at least 20% by weight of all polymerizable ingredients dissolved in said solution, casting said solution to the desired form, polymerizing the polyvinyl and monovinyl aromatic compounds of said solution to the insoluble infusible stage under conditions substantially preventive of the escape of solvent, to form a solid structure of the cast form, sulfonating said resulting structure under conditions substantially preventive of escape of solvent, and subsequently saturating the sulfonated solid structure with water.

13. The method of forming a solid unfractured electrically conductive, cation permeable, structure in the form of sheets and membranes and comprising as an essential part extending substantially throughout said structure a predominant amount of a sulfonated polymerization product of polyvinyl and monovinyl aromatic compounds comprising: forming a solution of a monovinyl aromatic compound and a polyvinyl aromatic compound selected from the group consisting of divinyl benzenes, divinyl toluenes, divinyl naphthalenes, divinyl xylenes, divinyl ethyl benzenes, divinyl chloro benzenes, divinyl-phenyl vinyl ethers and the alpha-substituted alkyl derivatives thereof, containing at least 25% by volume of an inert organic solvent said polyvinyl aromatic compound being at least 20% by weight of all polymerizable ingredients dissolved in said solution, casting said solution to the desired form and polymerizing the monovinyl and polyvinyl aromatic compound of said solution to the insoluble infusible stage under conditions substantially preventive of the escape of solvent, to form a solid unfractured structure of the cast form, treating the resulting structure with a sulfonating reagent under conditions substantially preventive of the escape of solvent therein, and subsequently saturating the solid structure with water.

14. The method of forming solid unfractured electrically conductive, re-inforced cation permeable structures in the form of sheets and membranes and comprising as an essential part extending substantially throughout said structure a predominant amount of a sulfonated polymerization product of a monovinyl aromatic compound and divinyl benzene comprising: the steps of casting to the desired form, around a suitable re-inforcing material a solution of at least one monovinyl aromatic compound and divinyl benzene containing at least 25% by volume of an inert organic solvent having a boiling point greater than 60° C., polymerizing the monovinyl aromatic compound and the divinyl benzene of said solution to the insoluble infusible stage under conditions substantially preventive of the escape of solvent to form a solid gel structure of the cast form, sulfonating said structure with a liquid sulfonating agent miscible with said solvent under conditions substantially preventive of the escape of said solvent, and subsequently saturating the sulfonated solid structure with water.

15. The method of forming solid, unfractured electrically conductive, cation permeable, gel structures in the form of a membrane and comprising as an essential part extending substantially throughout said structure, a predominant amount of a polymerizate of monovinyl and polyvinyl aromatic compounds comprising: forming a solution of at least one polyvinyl aromatic compound selected from the group consisting of the isomeric divinyl benzenes, divinyl toluenes, divinyl naphthalenes, divinyl xylenes, divinyl ethylbenzenes, divinyl chlorobenzenes, divinyl-phenyl vinyl ethers and the alpha-substituted alkyl derivatives thereof, and at least one monovinyl aromatic compound selected from the group consisting of styrene and the isomeric vinyl toluenes, vinyl naphthalenes, vinyl ethylbenzenes, vinyl chlorobenzenes, vinyl xylenes, and the alpha-substituted alkyl derivatives thereof, said polyvinyl aromatic compound constituting at least 20% and not more than 80% of the total of poly- and monovinyl aromatic compounds; said solution containing at least 25% and not more than 75% by volume of an inert organic solvent having a boiling point greater than 60° C. and selected from the group consisting of the aromatic hydrocarbons, the aliphatic alcohols, the aliphatic ketones, the aliphatic ethers, the chlorinated aliphatic hydrocarbons, and the aliphatic hydrocarbons; casting said solution to the desired form, copolymerizing the poly- and monovinyl aromatic compounds in said solution under conditions substantially preventive of the escape of solvent to the insoluble, infusible stage around a reinforcing medium having a void volume of at least 50%, said medium being present to the extent of not less than 5% nor more than 50% of the weight of said solution to form a solid reinforced gel structure of the cast form, replacing said solvent with a second inert organic solvent while maintaining the total solvent content, treating the resulting gel structure with a sulfonating agent selected from the group consisting of sulfuric acid, oleum, sulfur trioxide and chlorosulfonic acid under conditions substantially preventive of escape of said second solvent, thereby sulfonating said gel structure to the extent of not more than 6 equivalents of sulfonic acid per mol of polyvinyl aromatic compound and not less than 1 equivalent of sulfonic acid for each 10 mols of poly- and monovinyl aromatic compound, and subsequently saturating the sulfonated solid structure with water.

References Cited in the file of this patent

UNITED STATES PATENTS

| | | |
|---|---|---|
| 1,811,078 | Dykstra | June 23, 1931 |
| 2,366,007 | D'Alelio | Dec. 26, 1944 |
| 2,405,817 | D'Alelio | Aug. 13, 1946 |
| 2,500,149 | Boyer | Mar. 14, 1950 |
| 2,636,851 | Juda | Apr. 28, 1953 |

FOREIGN PATENTS

| | | |
|---|---|---|
| 572,272 | Great Britain | Oct. 1, 1945 |

OTHER REFERENCES

"Nature," vol. 165, April 8, 1950, page 568, article by Kressman.

Krczil: "Einstoffpolymerisation," Leipzig, 1940, p. 165.

Juda et al.: J. A. C. S., vol. 72, pg. 1044, 1950.